(12) United States Patent
Zohar et al.

(10) Patent No.: US 7,818,505 B2
(45) Date of Patent: Oct. 19, 2010

(54) METHOD AND APPARATUS FOR MANAGING A CACHE MEMORY IN A MASS-STORAGE SYSTEM

(75) Inventors: Ofir Zohar, Alfe-Menashe (IL); Yaron Revah, Tel-Aviv (IL); Haim Helman, Ramat Gan (IL); Dror Cohen, Tel Aviv (IL); Shemer Schwartz, Herzelia (IL)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 11/243,210

(22) Filed: Oct. 4, 2005

(65) Prior Publication Data

US 2006/0143395 A1 Jun. 29, 2006

Related U.S. Application Data

(60) Provisional application No. 60/639,780, filed on Dec. 29, 2004.

(51) Int. Cl.
G06F 12/00 (2006.01)
G06F 13/00 (2006.01)
G06F 13/28 (2006.01)
(52) U.S. Cl. ............................... 711/133; 711/E12.041
(58) Field of Classification Search .................. 711/118
See application file for complete search history.

(56) References Cited

U.S. PATENT DOCUMENTS

| 6,272,598 | B1 * | 8/2001 | Arlitt et al. | 711/133 |
| 2002/0069323 | A1 * | 6/2002 | Percival | 711/113 |
| 2002/0152361 | A1 * | 10/2002 | Dean et al. | 711/160 |
| 2003/0217230 | A1 * | 11/2003 | Rodriguez et al. | 711/136 |

OTHER PUBLICATIONS

Kai Cheng and Yahiko Kambayashi, "Advanced Replacement Policies for WWW Caching", Lecture Notes in Computer Science, 2000, Springer-Verlag Berlin Heidelberg, vol. 1846/2000, pp. 239-245.*

* cited by examiner

*Primary Examiner*—Matt Kim
*Assistant Examiner*—Ralph A Verderamo, III
(74) *Attorney, Agent, or Firm*—Griffiths & Seaton PLLC

(57) ABSTRACT

In accordance with some embodiments of the present invention, there is provided a cache management module for managing a cache memory device, comprising a groups management module adapted to define groups of allocation units in accordance with at least an operative criterion and to create a new group of allocation units whenever it is determined that in accordance with at least the operative criterion none of the one or more existing groups is appropriate to include an allocation unit, and a replacement procedure module adapted to manage the cache in terms of groups of allocation units, rather than in terms of discrete allocation units.

33 Claims, 5 Drawing Sheets

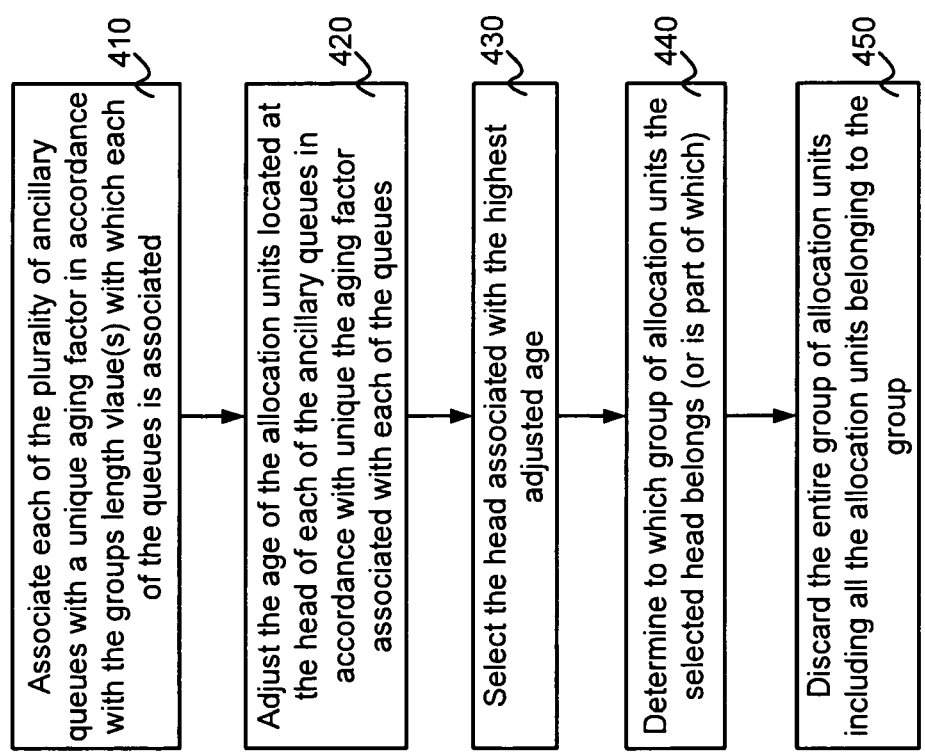

| Replacement Queue | Group Length Value | Aging Factor |
|---|---|---|
| LRU0 | 1 | 1 |
| LRU1 | 2-4 | 2 |
| LRU2 | 5-8 | 4 |
| LRU3 | 9 or more | 8 |

FIG. 4B

Associate each of the plurality of ancillary queues with a unique aging factor in accordance with the groups length vlaue(s) with which each of the queues is associated — 410

Adjust the age of the allocation units located at the head of each of the ancillary queues in accordance with unique the aging factor associated with each of the queues — 420

Select the head associated with the highest adjusted age — 430

Determine to which group of allocation units the selected head belongs (or is part of which) — 440

Discard the entire group of allocation units including all the allocation units belonging to the group — 450

FIG. 4A

METHOD AND APPARATUS FOR MANAGING A CACHE MEMORY IN A MASS-STORAGE SYSTEM

CROSS REFERENCE TO RELATED APPLICATIONS

This application claims priority from U.S. Provisional Patent Application No. 60/639,780, filed Dec. 29, 2004, which is hereby incorporated by reference in its entirety.

FIELD OF THE INVENTION

The present invention generally relates to the field of digital memory storage. More specifically, the present invention relates to a method and apparatus for managing data in a cache memory of a mass-storage device and/or system.

BACKGROUND OF THE INVENTION

A cache memory is a high-speed buffer located between a host(s) and a disk device(s), which is meant to reduce the overall latency of Input/Output (I/O) activity between the storage system and a host accessing data on the storage system. Whenever a host requests data stored in a memory system, the request may be served with significantly lower latency if the requested data is already found in cache, since this data must not be brought from the disks. As of the year 2004, speeds of IO transactions involving disk activity are typically on the order of 5-10 milliseconds, whereas IO speeds involving cache (e.g. RAM memory) access are on the order of several nanoseconds.

The relatively high latency associated with disk activity derives from the mechanical nature of the disk devices. In order to retrieve requested data from a disk based device, a disk controller must first cause a disk reading arm to physically move to a track containing the requested data. Once the head of the arm has been placed at the beginning of a track containing the data, the time required to read the accessed data on the relevant track is relatively very short, on the order of several microseconds.

One criteria or parameter which is often used to measure the efficiency of a cache memory system or implementation is a criteria referred to as a "hit ratio". A hit ratio of a specific implementation is the percentage of "data read" requests issued by the host that are already found in cache and that consequently did not require time intensive retrieval from disk operations. An ideal cache system would be one reaching a 100% hit ratio.

Intelligent cache algorithms aimed at raising the level of hit ratio to a maximum often implement in the cache (amongst other things) replacement procedures that establish a "discard priority". The discard priority relates to data portions which are already stored in the cache, and is responsible for managing the order by which each of the data portions that are currently stored in the cache are to be discarded. The various approaches to the management of the discard priority queue attempt to anticipate which of the data portions currently stored in the cache are the least likely to be requested by the host, and set the priority queue accordingly. Thus, whenever cache space is required for fetching new data into the cache, the discard priority queue is consulted, and the data portions which have been determined to be the least likely to be requested by the host are discarded first, in order to free up cache storage space which may be used for storing the newly fetched data. From another perspective, the various approaches to the management of the discard priority queue are intended to increase the likelihood that those portions of data that have been determined to be the most likely to be requested by the host will not be discarded prematurely in order to free up space or for any other purpose.

The link between certain data portions in the cache is significant for the purposes of replacement procedures. When a certain data portion has been addressed by a host as part of a certain group of operatively linked data portions or as part of a certain file, for example, it is likely that when that data portion is next addressed it will be addressed as part of the group or as part of the file, rather than as an isolated data portion. Furthermore, while the usage of the cache's memory resources grows with the amount of data fetched into the cache, fetching-time does not increase with the amount of data to be fetched into the cache. Thus, while fetching a large group and a small group (e.g., one) of linked data portions will require substantially the same amount time, discarding the larger group of linked data will free-up substantially more storage space.

Accordingly, it would be beneficial to manage the cache in terms of groups of operatively linked data portions, rather than in terms of discrete data portions. Furthermore, it would be beneficial to assign a discard priority to such groups of operatively linked data portions at least in accordance with the size each group. Yet furthermore, it would be beneficial to assign a discard priority to such groups of operatively linked data portions, such that, all other things being equal, larger groups are assigned with a higher priority to be discarded.

SUMMARY OF THE INVENTION

In accordance with some embodiments of the present invention, there is provided a method of managing a cache memory in a mass-storage system and a cache management module for managing a cache memory device. In accordance with some embodiments of the present invention, the cache management module may include a groups management module and a replacement procedure module. In accordance with some embodiments of the present invention, the groups management module may be adapted to define groups of allocation units in accordance with at least an operative criterion and to create a new group of allocation units whenever it is determined that in accordance with at least the operative criterion none of the one or more existing groups is appropriate to include an allocation unit, and the replacement procedure module may be adapted to manage the cache in terms of groups of allocation units, rather than in terms of discrete allocation units.

According to further embodiments of the present invention, in accordance with the operative criterion, the groups management module may be adapted to add the allocation unit to an existing group of allocation units in case the data associated with the allocation unit is in sequence with the data associated with the group of allocation units. According to yet further embodiments of the present invention, the groups management module may be adapted to add the allocation unit to an existing group of allocation units in case, in addition to being in sequence with the data associated with the allocation unit, the data associated with the group of allocation units was accessed while being stored in the cache.

In accordance with some embodiments of the present invention, the replacement procedure module may be adapted to create two or more queues, each being associated with groups of allocation units including a predefined number of allocation units, and to assign each of the groups of allocation units to one of the two or more queues in accordance with the size of the group of allocation units. According to further embodiments of the present invention, the replacement procedure module may be further adapted to assign to each of one or more of the replacement queues a predefined aging factor. The replacement procedure module may be further adapted to modify the age of one or more the groups or of one or more allocation units belonging to one or more groups in accordance with the aging factor associated with the replacement queue to which the groups have been assigned.

In accordance with some further embodiments of the present invention, the weight of the aging factor associated with each of the one or more queues may be associated with the size of the groups with which the queue is associated. In accordance with further embodiments of the present invention, the weight of the aging factors may be selected in a manner to cause the discarding of larger groups of allocation units to be accelerated. The replacement procedure module may be adapted to select the group of allocation units to be discarded in accordance with the modified age of one or more of the groups. For example, according to some embodiments of the present invention, the replacement procedure module may be adapted to select the allocation units which are associated with the oldest modified age.

Further embodiments of the present invention relate to a method of managing a cache memory in a mass-storage system. According to some embodiments of the method in accordance with the present invention, groups of allocation units may be defined in accordance with at least an operative criterion, such that a new group of allocation units is to be created whenever it is determined that in accordance with at least the operative criterion none of the one or more existing groups is appropriate to include an allocation unit, and the cache may be managed in terms of groups of allocation units, rather than in terms of discrete allocation units.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 4A is a flowchart illustration of a process of selecting a group of allocation units to be discarded from the cache, as part of some embodiments of the present invention;

FIG. 4B is an illustration of a table including an entry for each of a plurality of replacement queues, and wherein each replacement queue entry is associated with a certain group length value or with a certain range of group length values with which that queue is associated and with an aging factor which is associated with the group length value or with the range of group length values with which the replacement queue is associated;

Figure 1:
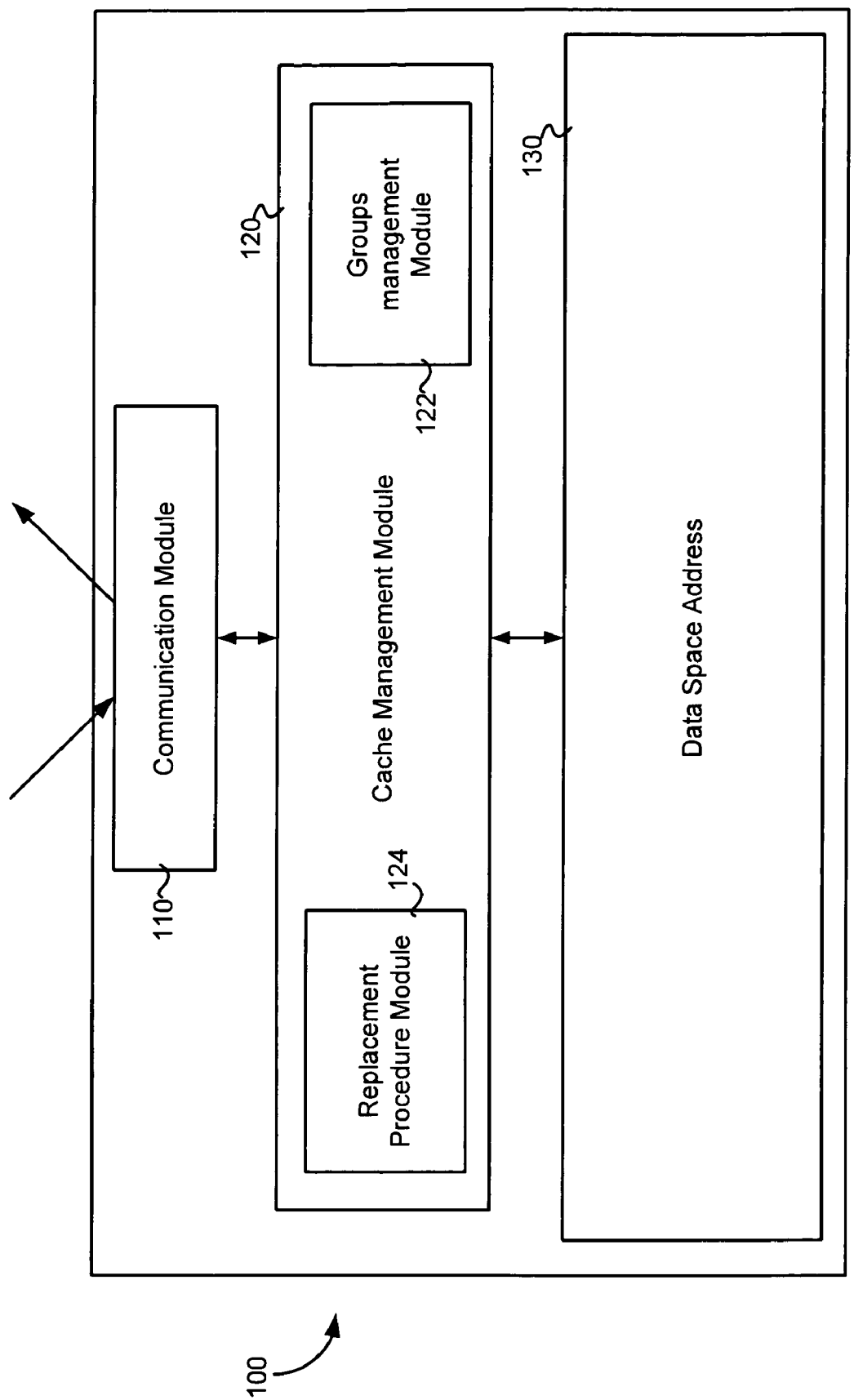
FIG. 1 is a block diagram of a cache memory device, in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Throughout the specification and the claims, the term "allocation unit" or the like, shall be used to describe an allocatable unit of cache storage space which may be allocated by a cache or by a cache's controller for storing data within the allocated storage space.

The terms "consecutive", "successive", "following", "preceding", "in sequence with" and the like shall be used throughout the specification and the claims to describe a corresponding relation between the respective indices of two or more allocation units in a cache storage memory. It should be noted, that an allocation unit as used herein may be comprised of one or more (commonly successive) data blocks. In the field of mass-storage systems, and other systems, one or more units of data are defined in the system and are indexed for purposes of data management, data traffic, data transfer, scaling, etc. Thus each data unit in the system is associated with one or more indicia. For example, in Storage Area Networks (SAN), several data units may be defined and indexed including the following: Logical Unit or Logical Volume (LU)—a LU is a string of consecutive blocks indicated by logical block addresses (LBAs) starting from 0 and going up to N, where N is the size of the LU; Partitions—a partition is a subunit of a LU and is comprised of a string of consecutive blocks which correspond to a certain segment of the LU of which the partition is part of. Partitions are indexed units and are commonly defined for purposes of internal management of data in the system. Thus, a LU consists of consecutive partitions; Allocation units—an allocation unit, as mentioned above, relates to an allocatable unit of cache storage space which may be allocated by a cache or by a cache's controller for storing data within the allocated storage space. In some storage systems, each allocation unit in the cache corresponds to one (whole) partition of the storage system. In other storage systems, such as the one described in U.S. Provisional Patent Application No. 60/639,780, filed Dec. 29, 2004 and in U.S. patent application Ser. No. 11/123,633 filed, May 6, 2005, allocation units are subunits of a partition comprised of a string of consecutive blocks which correspond to a certain segment of the partition, of which the allocation units is part of (and are therefore are smaller than partitions). In this case, partitions are strings of consecutive allocation units, each allocation unit is a string of consecutive blocks. In describing some embodiments of the present invention, for convenience purposes only, we relate to partitions as being the allocation units used in the cache, either explicitly or implicitly. However, it should be noted that the present invention is not limited in this respect; rather, some embodiments of the present invention may be implemented in conjunction with any cache using any kind of allocation units.

Reference is now made to FIG. 1, which is a block diagram of a cache memory device, in accordance with some embodiments of the present invention. As part of some embodiments of the present invention, the cache memory device 100 may include a communication module 110, a cache controller 120 and a data space address 130. As part of further embodiments of the present invention, the communication module 110 may be adapted to operatively connect the cache 100 with other components of a mass-storage system (not shown), including but not limited to other cache devices or disks and with hosts associated with the mass-storage system. The data space address 130 may be used to store data in the cache 100. Typically the data space address 130 may be used for temporarily storing in the cache 100 data received from the hosts or from the disks. However, the present invention is not limited in this respect, and the data space address 130 may be used for storing any kind of data for any length of time. In accordance with some embodiments of the present invention, the controller 120 may be adapted to manage the operation of the cache 100 and to manage one or more components of the cache 100, including but not limited to the management of the replacement of data in the cache 100. It should be noted that the generalized description of the cache memory device 100 provided above is exemplary in nature and that the present invention may be implemented as part of any suitable cache memory.

Figure 2:
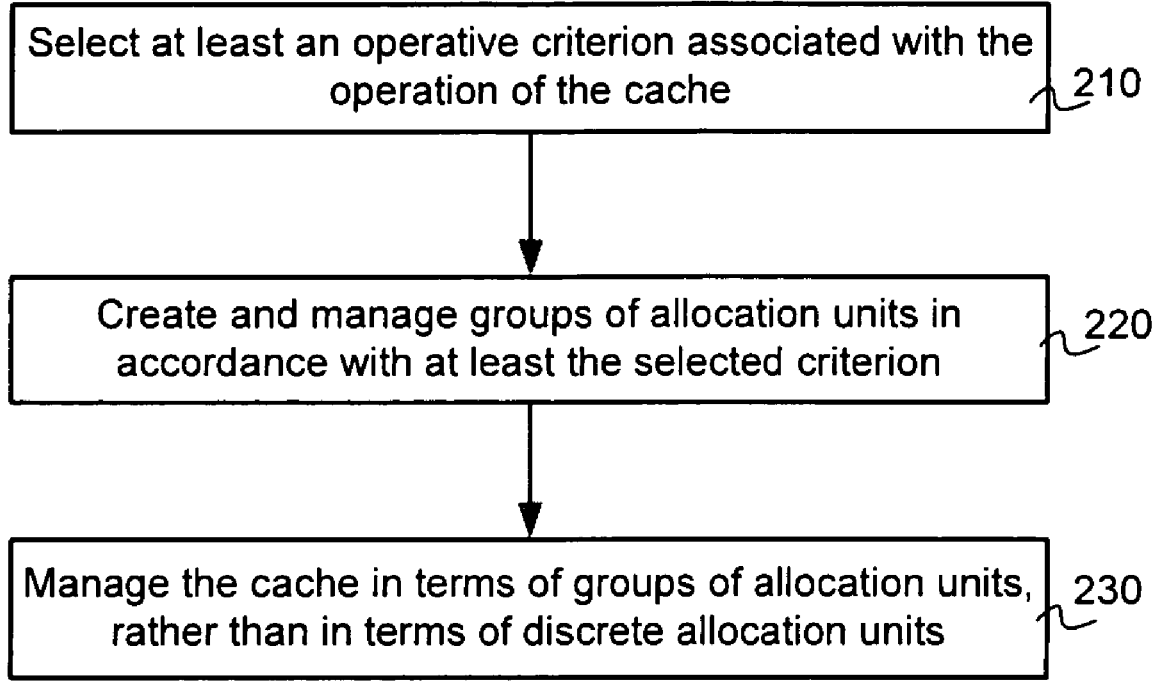
FIG. 2 is a flowchart illustration of some of a method of managing a cache memory in a mass storage system, in accordance with some embodiments of the present invention.

In accordance with some embodiments of the present invention, the cache controller 120 may include a groups management module 122 and a replacement procedure module 124. In accordance with further embodiments of the present invention, the cache controller 120 may include more than one replacement procedure module 124, as will be described below. Additional reference is now made to FIG. 2, which is a flowchart illustration of some aspects of a method of managing a cache memory in a mass storage system, in accordance with some embodiments of the present invention. In accordance with some embodiments of the present invention, an operative criterion associated with the operation of the cache 100 may be selected (block 210). In accordance with some embodiments of the present invention, the selected operative criterion may be implemented in the groups management module 122, and the groups management module 122 may be adapted to use the operative criterion to define, create and manage groups of allocation units. In accordance with further embodiments of the present invention, the groups management module 122 may be adapted to create and manage the groups of allocation units in accordance with at least the selected operative criterion (block 220). In accordance with further embodiments of the present invention, the groups management module 122 may be adapted to create the groups of allocation units, such that each group may be comprised of one or more allocation units meeting the operative criterion.

In accordance with some embodiments of the present invention, the cache controller 120 may be adapted to utilize the replacement procedure module 124 to manage the cache in terms of groups of allocation units, rather than in terms of discrete allocation units (block 230). In accordance with further embodiments of the present invention, whenever it is necessary to discard or remove data from the cache 100, for example, when the cache's data space address 130 is full or is nearing full (the amount of data in the data space address crosses 130 a predetermined capacity threshold, for example) and storage space needs to be freed in order to make place for new data, the cache controller 120 may be adapted to utilize the replacement procedure module 124 as part of selecting which of the groups of allocation units is to be discarded. In accordance with yet further embodiments of the present invention, the cache controller 120 may be adapted to utilize the replacement procedure module 124 to create one or more queues, each of which associated with one or more groups of allocation units. In accordance with some embodiments of the present invention, the replacement procedure module 124 may associate each of the queues with groups of allocation units having a certain length or a certain range of lengths. The length of a group may be determined by the number of allocation units included in the group. The replacement procedure module 124 may be adapted to implement one or more of the following replacement procedures: LRU, FIFO, LFU, MFU or random selection, to create the one or more queues, as will be described in greater detail hereinbelow.

Figure 3:
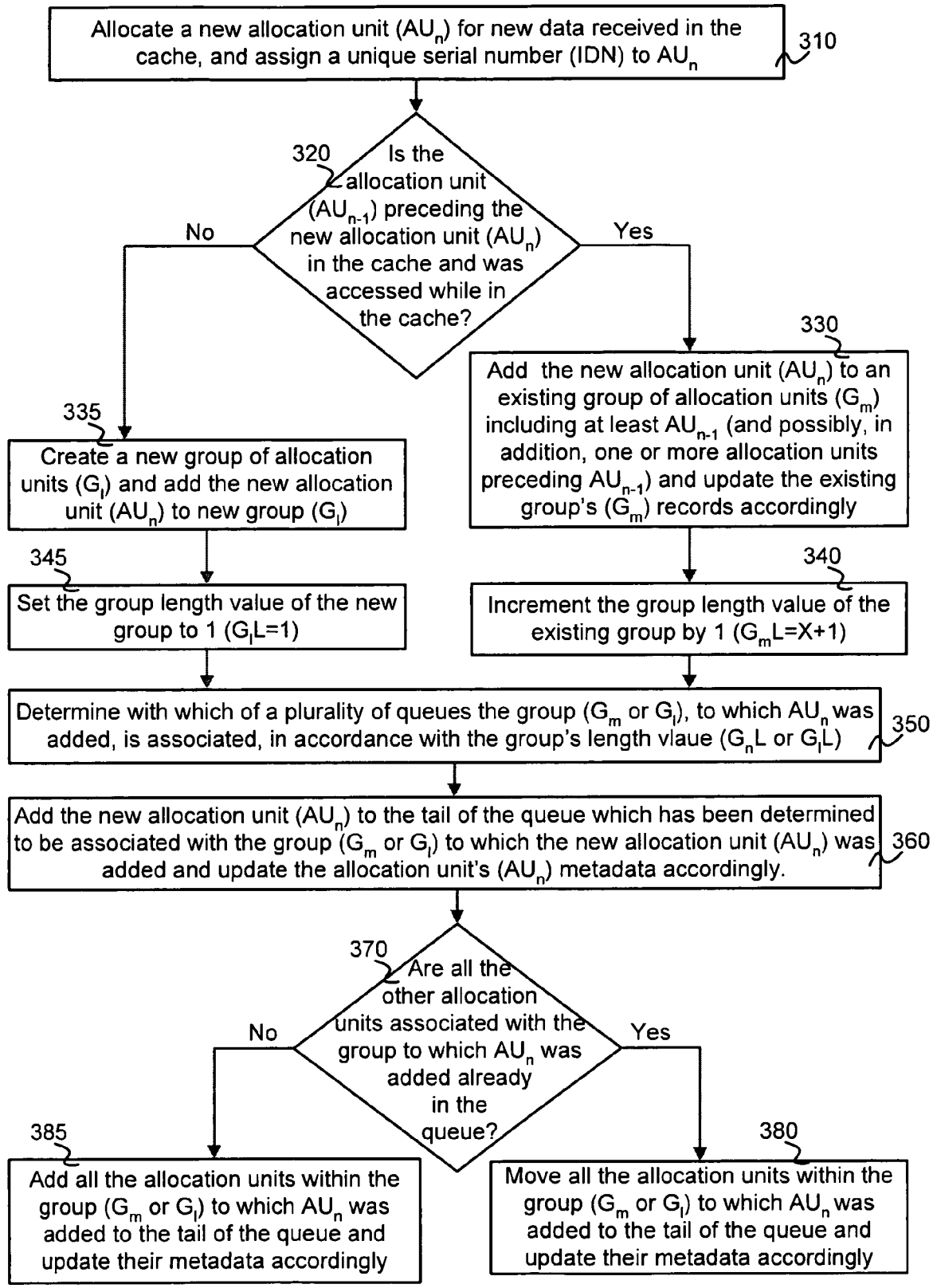
FIG. 3 is a flowchart illustration of some aspects of the method of managing a cache memory in a mass-storage system, in accordance with some embodiments of the present invention.

Reference is now made to FIG. 3, which is a flowchart illustration of some aspects of the method of managing a cache memory in a mass storage system, in accordance with some embodiments of the present invention. FIG. 3 and the description thereof which is detailed below relate to a preferred implementation of the method of managing a cache memory in a mass storage system, in accordance with some embodiments of the present invention. However, it should be noted that some aspects of the present invention are broader in scope than what is described with reference to FIG. 3. A description of more generic embodiments of the present invention shall be provided below.

In FIG. 3, a scenario whereby new data is brought into the cache 100, is described in accordance with some embodiments of the present invention. It should be noted however, that the present invention has a wider applicability, as will be described below. In cache storage devices, such as device 100, for example, when new data is brought into the cache 100, either as part of a read or a write request, if it is determined that the new data brought into the cache 100 is not associated with any of the existing allocation units, a new allocation unit $AU_n$ may be allocated in order to enable the storage of the new data in the cache 100. The creation of an allocation unit and the allocation of storage space in the cache's 100 data space address 130 are well known in the art. An example of a process including the creation of an allocation unit and the allocation of storage space in the cache's 100 data space address 130 is disclosed in U.S. Provisional Patent Application No. 60/639,780, filed Dec. 29, 2004 and in U.S. patent application Ser. No. 11/123,633 filed, May 6, 2005. In accordance with some embodiments of the present invention, a unique serial number IDN may be assigned to each allocation unit, e.g., $AU_n$ upon the allocation thereof (block 310).

In accordance with some embodiments of the present invention, whenever a new allocation unit (e.g., $AU_n$) is allocated, the cache controller 120, for example, may be configured to determine whether the allocation unit $AU_{n-1}$ preceding the new allocation unit $AU_n$ is in the cache 100, and if in the cache 100, whether it was accessed while in the cache 100 (block 320). In accordance with some embodiments of the present invention, if it is determine that the allocation unit $AU_{n-1}$ preceding the new allocation unit $AU_n$ is in the cache 100 and was accessed while in the cache 100, the new allocation unit $AU_n$ may be added to an existing group of allocation units $G_m$ which includes at least allocation unit $AU_{n-1}$, and possibly, one or more additional allocation units preceding $AU_{n-1}$ (block 330). However, if it is determined that the allocation unit $AU_{n-1}$ preceding the new allocation unit $AU_n$ is either not in the cache 100 or is in the cache 100 but was not accessed while in the cache 100, a new group of allocation units $G_1$ may be created, and the new allocation unit $AU_n$ may be added the new group of allocation units $G_1$ (block 335).

In accordance with some embodiments of the present invention, the groups management module 122, possibly in cooperation with the cache management module 120, may be adapted to determine whether a new allocation unit is associated with any of the existing groups of allocation units at least in accordance with a predefined criterion, and may be adapted to create a new group of allocation units when it is determined that a new allocation unit is not associated with any of the existing groups of allocation units. In accordance with further embodiments of the present invention, whenever a new group of allocation units is created, the groups management module 122 may be adapted to record data corresponding to the new group. In accordance with some embodiments of the present invention, the groups management module 122 may maintain a record for each group of allocation units specifying which allocation units belong that group. In accordance with further embodiments of the present invention, the groups management module 122 may be adapted to record in the metadata of each newly allocated allocation unit a reference to the group to which it belongs, such that all the allocation units in the cache 100 include such a reference.

In accordance with further embodiments of the present invention, the groups management module 122 may be further adapted to update the data records associated with any of the groups and/or with any (one or more) of the allocation units belonging to any of the groups whenever one of a set of predefined events which involve the group, or one (or more) of the allocation units belonging to the group, occurs. For example, as part of recording such an event, the time of occurrence of the event may be recorded in group's records and/or in the records of one or more of the allocation units belonging to the group. Examples of such events, may include, but are not limited to, the following: the addition of a new allocation unit to the group, the reading (accessing) of one of the allocation units belonging to the group while in the cache, etc. In accordance with further embodiments of the present invention, as part of recording or updating the records of a group of allocation units and/of one or more allocation units belonging to a certain group, the groups management module 122 may record a timestamp or a serial number (IDN), for example, corresponding to the time (absolute or relative) of occurrence of the event or any other predefined data associated with the event. It should be noted, that in accordance with some embodiments of the present invention, the groups management module 122 may be adapted to update the records of all of the allocation units belonging to a certain group, whenever a predefined event (or one of a set of predefined events) which involves one (or more) of the allocation units belonging to that group occurs. The groups management module 122 may also be configured to delete a group of allocation units and the data corresponding to the group when the groups is discarded from the cache. In accordance with some embodiments of the present invention, as part of discarding a group of allocation units, the groups management module 122, may be adapted to discard the entire group including all the allocation units belonging to the group, as will be described hereinbelow.

In accordance with some embodiments of the present invention, if the new allocation unit $AU_n$ has been added to an existing group of allocation units $G_m$, the group's group length value $G_mL$, which represents the number of allocation units included in or belonging to the group, may be incremented (e.g., by the groups management module 122) by 1 (block 340), to accommodate for the addition of the new allocation unit and the corresponding growth in size. In accordance with some embodiments of the present invention, if, however, a new group of allocation units $G_1$ has been created for the new allocation unit $AU_n$, the new group's group length value $G_nL$ may be set to 1 (block 345), corresponding to the fact that there is only one allocation unit associated with or belonging to the new group.

In accordance with some embodiments of the present invention, the replacement procedure module 124 may be utilized (for example, by the cache management module 120) to create a plurality (two or more) of queues, for example LRU0, LRU1, LRU2, LRU3. In accordance with some embodiments of the present invention, the replacement procedure module 124 may be adapted to implement any replacement technique or procedure to create and manage any of the queues, including, but not limited to one or more of the following replacement procedures: LRU, FIFO, LFU, MFU or random selection. For convenience purposes, throughout the description of the present invention, reference is made to the LRU type replacement procedure, and in other places the use of an LRU is assumed, although not always specifically stated. However, it should be noted that the present invention is not limited to the use of any one particular replacement procedure and that any replacement procedure known in the present or yet to be devised in the future may be used as part of some embodiments of the present invention. Furthermore, it should be noted that some of the embodiments of the present invention described throughout the specification assume the use of an LRU replacement queue. It would be readily apparent to those of ordinary skill in the art to modify these embodiments of the present invention, if necessary, in cases where other replacement procedures are used, to maintain the spirit of the present invention.

In accordance with some embodiments of the present invention, each of the plurality of queues (LRU0, LRU1, LRU2, LRU3, for example) may be associated with groups of allocation units having a certain length or a certain range of lengths. For example, each of the queues may be associated with a particular group length value or with a particular range of group length values, such that the queue to which a certain group of allocation units is to be assigned may be determined in accordance with the length of the group of allocation units. In accordance with some embodiments of the present invention, once the group's group length value ($G_mL$ or $G_nL$) has been updated (or set to 1), the groups management module 122 may be adapted to determine to with which of the plurality of queues, the group ($G_m$ or $G_n$) to which the new allocation unit $AU_n$ belongs is to be assigned (block 350). In accordance with further embodiments of the present invention, the groups management module 122 may determine to which of the queues the group to which the new allocation unit belongs is to be assigned, in accordance with the group's group length value ($G_mL$ or $G_nL$).

In accordance with some embodiments of the present invention, in case the new allocation unit $AU_n$ was added to an existing group of allocation units $G_m$, the group of allocation units $G_m$ may either be left within the current queue to which it has been assigned previous to the addition of the new allocation unit or it may be moved to a different queue, as will be described below. For example, in case the group's incremented group length value ($G_mL$) remains within the range of group length values with which the current queue is associated it will not be moved. However, if the group's incremented group length value ($G_mL$) exceeds the maximum group length value with which the current queue is associated, then the group $G_m$ may be transferred to a different queue. The queue to which the group $G_m$ may be transferred may be the one which is associated with the incremented group length value ($G_mL$).

In accordance with some embodiments of the present invention, once the replacement queue module 124, either independently or in cooperation with the groups management module 122, has determined to which of the queues (LRU0, LRU1, LRU2 or LRU3, for example) the group ($G_m$ or $G_n$) of allocation units to which the new allocation unit $AU_n$ belongs is to be assigned, the replacement procedure module 124 may add the new allocation unit $AU_n$ to the tail of the queue which was determined to be the one to receive the group ($G_m$ or $G_n$) of allocation units to which the new allocation unit $AU_n$ belongs (block 360). As part of adding the new allocation unit $AU_n$ to the selected queue, the allocation unit's metadata may be updated accordingly (for example, by the replacement procedure module 124). It should be noted that in the above embodiments of the present invention, the queues is assumed to implemented via an LRU replacement procedure, and accordingly, the new allocation unit is placed at the tail of the queue. However, it should also be noted, that the replacement queue module 124, may be otherwise configured to place the new allocation unit in a different position within the queue, for example, in case a different replacement procedure is implemented by the replacement queue module 124 to create and manage the replacement queue(s).

In accordance with some embodiments of the present invention, once the new allocation unit $AU_n$ is added to one of the queues, the replacement procedure 124, for example, in cooperation with the groups management module 122, may be adapted to determine whether all the allocation units belonging to the group ($G_m$ or $G_n$) to which the new allocation unit $AU_n$ was added are already in the queue to which the new allocation units was added (block 370). As mentioned above, in accordance with some embodiments of the present invention, in case the new allocation unit $AU_n$ was added to an existing group of allocation units $G_m$, the group's incremented group length value ($G_mL$) may either remain within the range of group length values of the queue with which the group $G_m$ has been associated previous to the addition of the new allocation unit $AU_n$, in which case, the group and/or the allocation units belonging to it may not be moved, or the group's incremented group length value ($G_mL$) may exceed the maximum group length value of the queue with which the group $G_m$ has been associated previous to the addition of the new allocation unit $AU_n$, in which case the group and/or the allocation units belonging to it may be transferred to a different queue. The queue to which the group $G_m$ may be transferred may be the one which is associated with the incremented group length value ($G_mL$).

In accordance with some embodiments of the present invention, if it is determined that all the allocation units belonging to the group ($G_m$ or $G_n$) to which the new allocation unit $AU_n$ was added are already in the queue to which the new allocation units was added, the replacement procedure module 124, for example, in cooperation with the groups management module 122, may be adapted to move all the allocation units belonging to the group (in this case only relevant for $G_m$) to the tail of the queue and, if necessary, update their metadata accordingly (block 380). However, in accordance with some embodiments of the present invention, if not all the allocation units belonging to the group ($G_m$ or $G_n$) to which the new allocation unit $AU_n$ was added are already in the queue to which the new allocation units was added, the replacement procedure module 124, may be adapted to move all the allocation units belonging to the group (in this case only relevant for $G_m$) to the tail of the queue to which the new allocation unit was added, which will typically be the queue which is associated with the incremented group length value ($G_mL$) (block 385).

As mentioned above, as part of the normal operation of the cache 100, at some point during the operation of the cache 100 (and usually, rather frequently) it may become necessary to discard data from the cache 100, for example, when the cache's data space address 130 is full or is nearing full. Reference is now made to FIG. 4A, which is a flowchart illustration of a process of selecting a group of allocation units to be discarded from the cache, as part of some embodiments of the present invention. As was described above, in accordance with some embodiments of the present invention, each allocation unit in the cache 100 may be associated with a certain group of allocation units, and each group of allocation units may include one or more allocation units. In accordance with further embodiments of the present invention, each of the groups of allocation units may be assigned to one of a plurality (two or more) of queues. In accordance with some embodiments of the present invention, each of the plurality of queues may be associated a particular aging factor (block 410). Each of the queues may be associated with a certain aging factor in accordance with the group length value(s) with which it is associated. In accordance with yet further embodiments of the present invention, the larger the group length value(s) with which a queue is associated, the larger the aging factor to be associated with that queue. It should be noted that the policy according to which the larger the group length value(s) with which a group is associated, the larger the aging factor to be associated with that group, is suitable for an LRU replacement procedure, and possibly for other replacement procedures as well. However, the present invention is not limited to this particular policy, and other policies may be used in accordance with some embodiments of the present invention, including, but not limited to, a reversed policy, in accordance with which, the larger the group length value(s) with which a group is associated, the smaller the aging factor which may be associated with that group.

Reference is now additionally made to FIG. 4B, which is an illustration of a table including an entry for each of a plurality of replacement queues, and wherein each replacement queue entry is associated with a certain group length value or with a certain range of group length values with which that queue is associated and with an aging factor which is associated with the group length value or with the range of group length values with which the replacement queue is associated. As part of some embodiments of the present invention, the cache management module 120 may include a table 460 including an entry for each of a plurality of replacement queues, for example, LRU0; LRU1; LRU2; and LRU3, and wherein each replacement queue entry is associated with a certain group length value or with a certain range of group length values with which that queue is associated, for example, 1; 2-4; 5-8; and 9 or more, respectively, and with an aging factor, for example, 1; 2; 4; and 8, respectively, which is associated with the group length value or with the range of group length values with which the replacement queue is associated. The table 460 may be used by the replacement procedure module 124 and/or by the groups management module 122 from time to time, as part of the management of the cache 100, as detailed throughout the specification. It should be noted, that cache management module 120, for example, may be adapted to modify some of the data in the table 460, from time to time, in accordance with cache management policy changes, including, but not limited to, the following changes: the addition or the cancellation of a queue; the updating of the group length values associated with one or more of the queues; and/or the updating of the aging factors associated with each of the queues.

As mentioned above, in accordance with some embodiments of the present invention whenever a new allocation unit (e.g. $AU_n$) is allocated in the cache 100 a timestamp or a unique serial number (IDN) corresponding to the time (absolute or relative) of the allocation may be assigned to the new allocation unit. In accordance with further embodiments of the present invention, in case while in the cache, an allocation unit is accessed, the timestamp or the serial number associated with the accessed allocation unit may be replaced with a timestamp or a serial number corresponding to the time or instant in which the (absolute or relative) allocation unit was accessed. As part of assigning or replacing a timestamp or a unique serial number associated with an allocation unit, the timestamp or the unique serial number may be written into the allocation unit's metadata or the timestamp or the unique serial number in the allocation unit's metadata may be replaced, for example.

In accordance with some embodiments of the present invention, each of the allocation units in the cache 100 may be associated with a certain age or age value corresponding to the amount of time since the allocation unit was allocated or corresponding to the amount of time since the allocation units was most recently accessed. In accordance with some embodiments of the present invention, The age of an allocation unit at a certain point in time may be associated with the difference between the current clock or the current serial number (the one following the serial number assigned to the most recently allocation unit, for example) and the timestamp or the serial number in the allocation unit's metadata. For example, the age of an allocation unit may be determined by subtracting the serial number in the allocation unit's metadata from the current serial number.

In accordance with further embodiments of the present invention, an age value may be calculated for each group and not in-separate for each allocation unit in the cache. In accordance with some embodiments of the present invention, the age value of each of the groups may be determined in accordance with the age of one or more of the allocation units within that group. For example, in accordance with some embodiments of the present invention, the age of a certain group may be determined in accordance with, but not limited to, the following: the age of the youngest allocation unit in the group, the age of the oldest allocation unit in the group, the average age of all the allocation units in the group, etc. In accordance with some embodiments of the present invention, the age of the group of allocation units may be used to determine the age of one or more (e.g., all) the allocation units belonging to that group. For example, the age of the group of allocation units may be assigned to each of the allocation units belonging to that group. Throughout the specification and the claims, whenever reference is made to the age of an allocation units, unless explicitly or implicitly evident to the contrary, the age of the group of allocation units of which the allocation unit is part of part of, may be used instead.

Returning to FIG. 4A, in accordance with some embodiments of the present invention, the cache management module 120, for example, may be adapted to adjust the age of each of the allocation units located at the head of each of the queues, in accordance with the aging factor that is associated with each of the queues (unless for one or more of the queues, the aging factor is 1, in which case, the age will remain unchanged) (block 420). In accordance with some embodiments of the present invention, if in accordance with the policy implemented in the cache 100, the larger the group length value(s) with which a queue is associated the larger the aging factor which may be associated with that queue, the age of the heads of the queues which are associated with the larger the group length value(s) may be modified to a greater extent since these queues are associated with the substantially larger aging factors. However, as stated above, the present invention is not limited to this policy.

Once the ages of the heads of the queues are adjusted, the cache management module 120, for example, may be adapted to select from amongst the heads of the queues, the allocation unit (or the group of allocation units) having the highest adjusted age (block 430). The cache controller 120, may then determine, for example, in cooperation with the groups management module 122, to which group of allocation units the head of the queue which has been selected belongs (or is part of which) (block 440). Once the cache controller 120 determines to which group of allocation units the head of the queue which has been selected belongs, the cache controller may discard the entire group of allocation units, including all the allocation units belonging to that group (block 450).

Figure 5A:
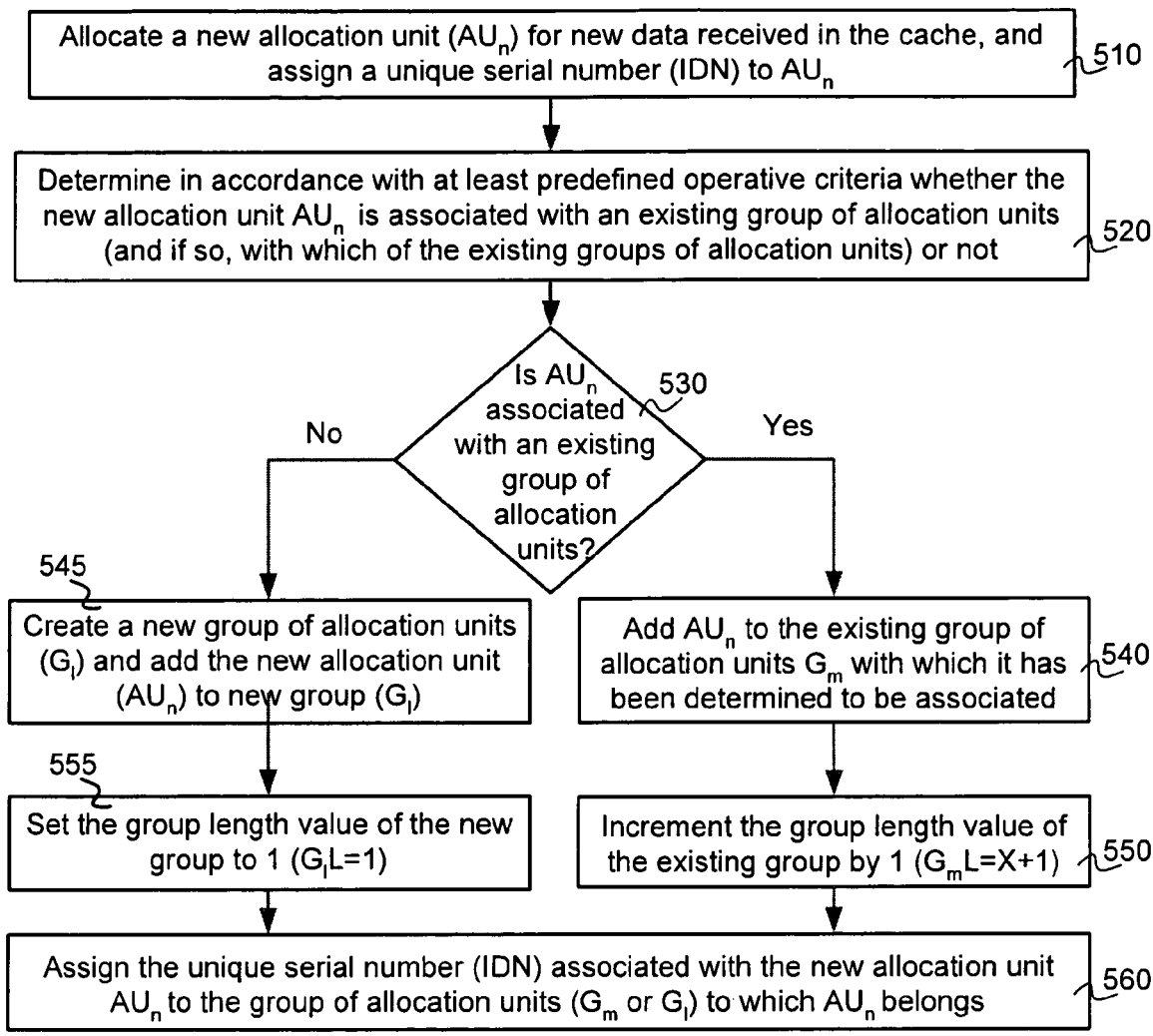
FIG. 5A is a flowchart illustration of some aspects of the method of managing a cache memory in a mass-storage system, in accordance with some embodiments of the present invention.

Reference is now made to FIG. 5A, which is a flowchart illustration of some aspects of the method of managing a cache memory in a mass-storage system, in accordance with some embodiments of the present invention. In accordance with some embodiments of the present invention, whenever a new allocation unit is allocated in the cache 100, the cache management module controller 120 may be adapted to allocate a new allocation unit (AUn) for new data received in the cache 100, and to assign a unique serial number (IDN) to the new allocation unit AUn (block 510). Once the allocation unit has been allocated, the groups management module 122 may be adapted to determine in accordance with at least predefined operative criteria whether the new allocation unit $AU_n$ is associated with an existing group of allocation units (and if so, with which of the existing groups of allocation units), or whether a new group of allocation units should be created for the new allocation unit (blocks 520 and 530).

One example of an operative criterion which may be utilized, according to some embodiments of the present invention, by the groups management module 122 to determine whether a new allocation unit is associated with an existing group of allocation units, and if so, with which of the existing groups of allocation units was already discussed above with reference to FIG. 3. Some additional examples, in accordance with further embodiments of the present invention, include the following operative criteria. Associate a new allocation unit with an existing group of allocation units if one of the existing groups of allocation units includes one or more allocation units which are in sequence with the new allocation unit and in addition were accessed while being stored in the cache 100; Associate a new allocation unit with an existing group of allocation units if one of the existing groups of allocation units includes one or more allocation units which immediately follow the new allocation unit; Associate a new allocation unit with an existing group of allocation units if one of the existing groups of allocation units includes one or more allocation units which, in addition to being in sequence, for example, with the new allocation unit, were at least partially accessed while being stored in the cache 100; Associate a new allocation unit with an existing group of allocation units if one of the existing groups of allocation units includes one or more allocation units which, in addition to being in sequence, for example, with the new allocation unit, at least a predefined portion of the one or more allocation units was accessed while being stored in the cache 100; Associate a new allocation unit with an existing group of allocation units if one of the existing groups of allocation units includes one or more allocation units which, in addition to being in sequence, for example, with the new allocation unit, were accessed at least a predetermined number of times while being stored in the cache 100; Associate a new allocation unit with an existing group of allocation units if one of the existing groups of allocation units includes one or more allocation units which, in addition to being in sequence, for example, with the new allocation unit, were accessed in a certain predefined sequence while being stored in the cache 100. Associate a new allocation unit with an existing group of allocation units if one of the existing groups of allocation units includes one or more allocation units which, in addition to being in sequence, for example, with the new allocation unit, were accessed within a predetermined period of time.

It should be noted that as part of some embodiments of the present invention, any known in the present, or yet to be devised in the future, techniques, including various techniques which are well known in the present, may be used to implement the above operative criteria. As part of the implementation of one or more of the above operative criteria, the cache management module 120 and/or the groups management module 122, may be adapted to add various data to the metadata of one or more allocation units and/or to one or more data records associated with one or more of the groups of allocation units, including, but not limited to, various timestamps corresponding to various predefined events involving the allocation units or the groups of allocation units.

It should be noted that the above examples of various operative criteria used to determine whether an allocation unit should be added to an existing group of allocation units or not, are not exhaustive in nature, and that in accordance with further embodiments of the present invention the groups management module 122 may be configured to determine whether an allocation unit should be added to an existing group of allocation units in accordance with other operative criterion or criteria and combinations of various operative criteria, either in addition or in alternative to the operative criteria discussed above.

Those of ordinary skill in the art may appreciate that, in mass-storage systems, operatively related data (for example, data that is part of the same file) is often stored in consecutive locations in memory and/or is associated with consequtive serial numbers recognized throughout the stoage system. Due to this operative connection, and for other reasons, in mass-storage systems, consecutive data is often accessed together, for example, as part of processing a file which the consecutive data is part of. This concept is well known in the art and is sometimes referred to as "sequential locality". Thus, by keeping consecutive, or otherwise related data together (either by maintaining the related data in the cache or by discarding it as a single unit) the efficiency of the cache may be improved.

In accordance with some embodiments of the present invention, in case, in accordance with at least the operative criterion, the groups management module 122 determines that the new allocation unit $AU_n$ is associated with one of the existing groups of allocation units ($G_m$), the groups management module 122 may be adapted to add the new allocation unit $AU_n$ to the existing group of allocation units $G_m$ which was determined to be associated with the new allocation unit $AU_n$ (block 540). In accordance with further embodiments of the present invention, the groups management module 122 may be adapted to create a new group of allocation units ($G_1$) in case it is determined that in accordance with the operative criterion, none of the existing groups of allocation units is appropriate to include the new allocation unit $AU_n$. Once the groups management module 122 creates a new group of allocation units, the groups management module 122 may add (or otherwise associate) the new allocation unit $AU_n$ to the new group (block 545).

In accordance with some embodiments of the present invention, the groups management module 122 may include or may be associated with a storage device (not shown). In accordance with some embodiments of the present invention, the storage device may be used by the groups management module 122 to store a database including data relating to the groups of allocation units and to the allocation units belonging to each group. In accordance with some embodiments of the present invention, each entry in the database may be associated with one of the existing groups of allocation units, and may include, but not limited to including, data specifying which allocation units (one or more) belong to that group, the size of the group (the group's group length value, for example), and the aging factor associated with that group, which will be discussed in greater detail below.

In accordance with some embodiments of the present invention, if the new allocation unit $AU_n$ has been added to an existing group of allocation units $G_m$, the group's group length value $G_mL$, which represents the number of allocation units included in or belonging to the group, may be incremented (e.g., by the groups management module 122) by 1 (block 550), to accommodate for the addition of the new allocation unit $AU_n$ and the corresponding growth in size. In accordance with some embodiments of the present invention, if, however, a new group of allocation units $G_1$ has been created for the new allocation unit $AU_n$, the new group's group length value $G_nL$ may be set to 1 (block 555), corresponding to the fact that there is only one allocation unit associated with or belonging to the new group.

In accordance with some embodiments of the present invention, as part of adding the new allocation unit to a group of allocation units (whether an existing group $G_m$ or a newly created group $G_1$), in addition to updating the group length value, the unique serial number (IDN) associated with the new allocation unit $AU_n$ may be assigned to the group of allocation units ($G_m$ or $G_1$) to which the new allocation unit $AU_n$ was added and/or to each of the allocation units belonging to the group of allocation units to which the new allocation units was added (this option is application only to the existing group of allocation units $G_m$) (block 560). In accordance with some embodiments of the present invention, the unique serial number, IDN, is the serial number assigned to the new allocation unit upon the allocation thereof. However, as mentioned above, in accordance with further embodiments of the present invention, instead of the (relative) unique serial number (IDN), a timestamp, for example, corresponding to the time (absolute or relative) of occurrence of the allocation of the new allocation unit may be assigned to the new allocation unit, in which case, the timestamp associated with the new allocation unit $AU_n$ may be assigned to the group of allocation units ($G_m$ or $G_1$) to which the new allocation unit $AU_n$ was added and/or to each of the allocation units belonging to the group of allocation units to which the new allocation units was added.

In accordance with some embodiments of the present invention, the assignment of a unique serial number (IDN) or of a timestamp to a certain allocation unit, and as a result, to the group of allocation units to which that allocation units belongs and/or to each of the allocation units belonging to the group of allocation units to which the that allocation units belongs may occur in response to other events, in addition to the allocation of the allocation unit. For example, a new IDN or a timestamp may be assigned to an allocation unit whenever the allocation unit is accessed while in the cache. Thus, in accordance with some embodiments of the present invention, a new IDN or a timestamp corresponding to the (time of occurrence of) accessing of a certain allocation unit while in the cache may be assigned to the group of allocation units to which that allocation units belongs and/or to each of the allocation units belonging to the group of allocation units to which the that allocation units belongs.

Since, as was discussed above and as will be further described below, in accordance with some embodiments of the present invention, the discard priority of the groups of allocation units (or of the groups of allocation units which are the candidates for being discarded) may be determined in accordance with (amongst other factors) the serial number of the timestamp associated with each of the groups and/or with the serial number or the timestamp associated with one or more (e.g., each of) the allocation units belonging to each of the groups, a recent accessing of an allocation unit belonging to a certain allocation unit may change the group's priority to be discarded. For example, in accordance with some embodiment of the present invention, in case an LRU replacement procedure is implemented in the cache 100, and a certain group is assigned with a serial number of a timestamp corresponding to a recent event involving one of the allocation units belonging to that group, that group may receive a lower priority to be discarded due to its association with the serial number or timestamp corresponding to the substantially recent event.

Figure 5B:
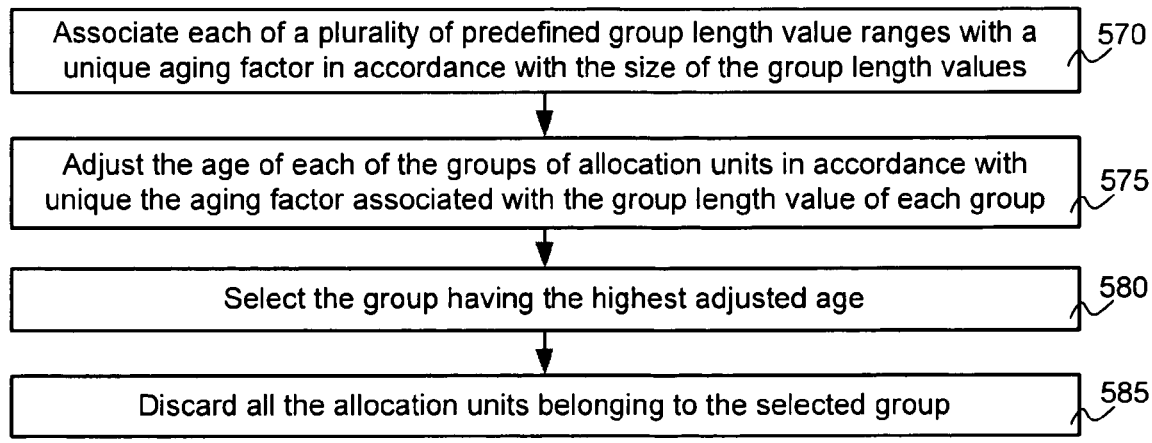
FIG. 5B is a flowchart illustration of a process of selecting a group of allocation units to be discarded from the cache, as part of some embodiments of the present invention.

Reference is now made to FIG. 5B, which is a flowchart illustration of a process of selecting a group of allocation units to be discarded from the cache, as part of some embodiments of the present invention. In accordance with some embodiments of the present invention, each of a plurality of predefined group length value ranges may be associated with a unique aging factor in accordance with the size of the group of length values (block 570). For example, in accordance with some embodiments of the present invention, group length value ranges associated with longer groups of allocation units may be associated with larger aging factors, for example. It should be noted that ranges of group length values are used here as an example only, and that further embodiments of the present invention may similarly apply to specific group length values and to various combinations of specific group length values with ranges of group length values. It should be noted that the policy according to which the larger the group length value(s) with which a group is associated, the larger the aging factor to be associated with that group, is suitable for an LRU replacement procedure, and possibly for other replacement procedures as well. However, the present invention is not limited to this particular policy, and other policies may be used in accordance with some embodiments of the present invention, including, but not limited to, a reversed policy, in accordance with which, the larger the group length value(s) with which a group is associated, the smaller the aging factor which may be associated with that group.

In accordance with some embodiments of the present invention, the cache management module 120, may be adapted to adjust the age of each of the groups of allocation units in accordance with the aging factors associated with each of the group's group length value (unless for one or more of the groups, the aging factor is 1, in which case, the age will remain unchanged) (block 575). In accordance with some embodiments of the present invention, if in accordance with the policy implemented in the cache 100, the larger a group's group length value(s) is, the larger the aging factor which may be associated with that group, the age of the longer or larger groups may be modified to a greater extent since these groups are associated with the larger aging factors. However, as stated above, the present invention is not limited to this policy.

Once, the ages of the groups are adjusted, the cache management module 120, for example, may be adapted to select from amongst all the groups of allocation units, the group of allocation units having the highest adjusted age (block 580). The cache management module 120, may then determine, for example, in cooperation with the groups management module 122, which allocation units belong to or are included in that group, and may discard all the allocation units belonging to that group (block 585).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method of managing a cache memory in a mass-storage system, said method comprising:
    defining a plurality of groups of allocation units, each group of allocation units based on a number of allocation units;
    receiving a new allocation unit;
    creating a new group of allocation units if the new allocation unit is not associated with any of the plurality of groups of allocation units based on the operative criteria;
    adding the new allocation unit to one of the plurality of groups of allocation units if the new allocation unit is associated with the one of the plurality of groups of allocation units; and
    managing the cache in terms of groups of allocation units, rather than in terms of discrete allocation units, wherein said managing comprises:
        defining a plurality of replacement queues for the plurality of groups of allocation units, each replacement queue associated with a different number of allocation units or a different range of allocation units, assigning each group of allocation units to a replacement queue, each respective group of allocation units assigned to the replacement queue including a same associated number of allocation units or to the replacement queue including a range of allocation units within which the number of allocation units for a particular group of allocation units falls within, re-assigning the one of the plurality of groups of allocation units to a different replacement queue based on the addition of the new allocation unit modifying the number of allocation units in the one of the plurality of groups of allocation units, and associating each replacement queue with a predefined aging factor based on the number of allocation units or the range of allocation units.

2. The method according to claim 1, wherein said assigning further includes modifying an age of one or more groups of one or more allocation units belonging to one or more groups in accordance with the aging factor associated with the replacement queue to which the groups have been assigned.

3. The method according to claim 2, wherein a weight of the aging factor associated with each of the plurality of replacement queues is associated with the size of the groups with which the replacement queue is associated.

4. The method according to claim 1, wherein a weight of the aging factors is selected in a manner to cause the discarding of larger groups of allocation units to be accelerated.

5. The method according to claim 4, further comprising selecting the group of allocation units to be discarded in accordance with the modified age of one or more of the groups.

6. The method according to claim 5, wherein said selecting further comprises selecting the allocation units which is associated with the oldest modified age.

7. The method according to claim 5, wherein said selecting further comprises calculating a modified age of each of the groups located at the head of each of the queues; and amongst the heads of the queues, selecting the group which is associated with the oldest modified age.

8. The method according to claim 1, wherein said managing further comprises utilizing a replacement procedure to determine a discard priority of the groups of allocation units.

9. The method according to claim 8, wherein said utilizing further comprises utilizing a replacement procedure selected from the group consisting of: LRU, FIFO, LFU, MFU or random selection, to calculate a discard priority of one or more of the groups of allocation units.

10. The method according to claim 8, wherein said managing further includes modifying one or more parameters used by the replacement procedure to calculate the discard priority of the groups of allocation units for one or more groups of allocation units in accordance with one or more characteristics associated with each of the plurality of groups.

11. The method according to claim 10, wherein said modifying further comprises modifying the discard priority of one or more of the groups of allocation units in accordance with at least the size of the one or more of the groups.

12. The method according to claim 10, wherein said modifying further comprises modifying the discard priority of one or more of the groups of allocation units, such that, all other things being equal, larger groups are to be assigned with a higher priority to be discarded.

13. A cache management module for managing a cache memory device, said cache management module comprising:

a groups management module configured to:

define groups of allocation units based on an operative criteria and a number of allocation units, receive a new allocation unit, create a new group of allocation units if the new allocation unit is not associated with any of the groups of allocation units, and add the new allocation unit to one of the groups of allocation units if the new allocation unit is associated with the one of the groups of allocation units; and a replacement procedure module configured to:

manage the cache in terms of groups of allocation units, rather than in terms of discrete allocation units, create a plurality of replacement queues for the groups of allocation units, each replacement queue being associated with a different number or a different range of allocation units, assign each of the groups of allocation units to one of the plurality of replacement queues based on a match between a number or a range of allocation units in each replacement queue and the number of allocation units in each particular group of allocation units, re-assign the one of the groups of allocation units to a different replacement queue based on the addition of the new allocation unit modifying the number of allocation units in the one of the groups of allocation units, and assign each replacement queue with a predefined aging factor based on the number or the range of allocation units.

14. The cache management module according to claim 13, wherein said replacement procedure module is further adapted to modify an age of one or more groups or of one or more allocation units belonging to one or more groups in accordance with the aging factor associated with the replacement queue to which the groups have been assigned.

15. The cache management module according to claim 14, wherein a weight of the aging factor associated with each of the replacement queues is associated with the size of the groups with which the replacement queue is associated.

16. The cache management module according to claim 15, wherein said replacement procedure module is adapted to select the group of allocation units to be discarded in accordance with the modified age of one or more of the groups.

17. The cache management module according to claim 14, wherein a weight of the aging factors is selected in a manner to cause the discarding of larger groups of allocation units to be accelerated.

18. The cache management module according to claim 17, wherein said replacement procedure module is adapted to select the allocation units which is associated with the oldest modified age.

19. The cache management module according to claim 17, wherein said replacement procedure module is adapted to calculate a modified age of each of the groups located at the head of each of the queues and to select from amongst the heads of the queues the group which is associated with the oldest modified age.

20. The cache management module according to claim 19, wherein said replacement procedure module is adapted to utilize a replacement procedure to determine a discard priority of the groups of allocation units.

21. The cache management module according to claim 20, wherein said replacement procedure module is adapted to utilize a replacement procedure selected from the group consisting of: LRU, FIFO, LFU, MFU or random selection, to determine the discard priority of one or more of the groups of allocation units.

22. The cache management module according to claim 19, wherein said groups management module is adapted to modify one or more parameters used by the replacement procedure module to calculate the discard priority of the groups of allocation units, in accordance with one or more characteristics associated with each of the plurality of groups of allocation units.

23. The cache management module according to claim 22, wherein said groups management module is adapted to modify one or more parameters used by the replacement procedure module to calculate the discard priority of the groups of allocation units, such that, all other things being equal, larger groups are to be assigned with a higher priority to be discarded.

24. A method of managing a cache memory in a mass-storage system, said method comprising:
    defining a plurality of groups of allocation units, each group of allocation units based on a respective operative criteria and including a number of allocation units;
    determining that an event associated with the respective operative criteria has occurred for a group of allocation units, the event including increasing a number of allocation units in the group of allocation units by one or more allocation units; and
    managing the cache in terms of groups of allocation units, rather than in terms of discrete allocation units, wherein said managing comprises:
        defining a plurality of replacement queues, each replacement queue being associated with a different number or range of allocation units,
        associating each replacement queue with a predefined aging factor based on a value or a range of values of the number of allocation units,
        assigning the group of allocation units to a first replacement queue prior to the event, and
        re-assigning the group of allocation units to a different replacement queue in response to the event.

25. The method according to claim 24, wherein a weight of the aging factor is selected in a manner to cause the discarding of larger groups of allocation units to be accelerated.

26. The method according to claim 25, further comprising selecting the group of allocation units to be discarded in accordance with the modified age of one or more of the groups.

27. The method according to claim 26, wherein said selecting further comprises selecting the allocation units which is associated with the oldest modified age.

28. The method according to claim 26, wherein said selecting further comprises calculating a modified age of each of the groups located at the head of each of the queues; and
    amongst the heads of the queues, selecting the group which is associated with the oldest modified age.

29. The method according to claim 24, wherein said managing further comprises utilizing a replacement procedure to determine a discard priority of the groups of allocation units.

30. The method according to claim 29, wherein said utilizing further comprises utilizing a replacement procedure selected from the group consisting of: LRU, FIFO, LFU, MFU or random selection, to calculate a discard priority of one or more of the groups of allocation units.

31. The method according to claim 29, wherein for one or more groups of allocation units, said managing further includes modifying one or more parameters used by the replacement procedure to calculate the discard priority of the groups of allocation units, in accordance with one or more characteristics associated with each of the one or more groups.

32. The method according to claim 31, wherein said modifying further comprises modifying the discard priority of one or more of the groups of allocation units in accordance with at least the size of the one or more of the groups.

33. The method according to claim 31, wherein said modifying further comprises modifying the discard priority of one or more of the groups of allocation units, such that, all other things being equal, larger groups are to be assigned with a higher priority to be discarded.

* * * * *